United States Patent
Hsu et al.

(10) Patent No.: US 7,324,433 B1
(45) Date of Patent: Jan. 29, 2008

(54) METHOD AND APPARATUS FOR DETERMINING SIGNAL QUALITY

(75) Inventors: Yungping Hsu, Cupertino, CA (US); Ricky Cheung, Stanford, CA (US)

(73) Assignee: Marvell International Ltd., Hamilton (BM)

( * ) Notice: Subject to any disclaimer, the term of this patent is extended or adjusted under 35 U.S.C. 154(b) by 1023 days.

(21) Appl. No.: 10/105,130

(22) Filed: Mar. 21, 2002

Related U.S. Application Data

(60) Provisional application No. 60/334,347, filed on Nov. 29, 2001.

(51) Int. Cl. *H04J 11/00* (2006.01)
(52) U.S. Cl. .................. 370/208; 370/342; 370/479; 375/142; 375/150
(58) Field of Classification Search ............... 370/347, 370/336, 204, 252, 329, 708, 752, 330, 342, 370/441, 479; 375/206, 145, 142, 150
See application file for complete search history.

(56) References Cited

U.S. PATENT DOCUMENTS

| | | | | |
|---|---|---|---|---|
| 5,615,227 | A * | 3/1997 | Schumacher et al. | 375/142 |
| 5,903,554 | A | 5/1999 | Saints | 370/342 |
| 6,252,898 | B1 | 6/2001 | Eto et al. | 375/130 |
| 6,275,485 | B1 | 8/2001 | Padovani | 370/342 |
| 6,278,726 | B1 | 8/2001 | Mesecher et al. | 375/148 |
| 6,292,519 | B1 | 9/2001 | Popovic | 375/376 |
| 6,647,077 | B1 * | 11/2003 | Shan et al. | 375/346 |
| 6,882,692 | B2 * | 4/2005 | Somayazulu | 375/343 |
| 7,010,559 | B2 * | 3/2006 | Rawlins et al. | 708/425 |

FOREIGN PATENT DOCUMENTS

| | | |
|---|---|---|
| WO | WO 00/72540 A1 | 11/2000 |
| WO | WO 01/03334 A1 | 2/2001 |
| WO | WO 01/35541 A2 | 5/2001 |
| WO | WO 01/61902 A1 | 8/2001 |

OTHER PUBLICATIONS

U.S. Appl. No. 10/080,826, filed Feb. 21, 2002, Hsu et al.
U.S. Appl. No. 10/092,971, filed Mar. 5, 2002, Hsu et al.

(Continued)

*Primary Examiner*—John Pezzlo

(57) ABSTRACT

The present invention is directed to a method, program product, and apparatus that determines a signal quality associated with a symbol modulated signal based on a scalar relationship based on at least one of a comparison of plural correlation candidates for a symbol in the modulated signal or a comparison of the vector corresponding to a decided symbol against a reference. In accordance with one aspect of the present invention, a method and apparatus are disclosed which involve determining maximum and next-maximum correlation candidates for a symbol perceived in the modulated signal, calculating the scalar relationship between the maximum and next-maximum correlation candidates, and deriving a signal quality associated with the modulated signal based on the scalar relationship. In accordance with another aspect of the present invention, a method and apparatus are disclosed which involve determining a decided symbol for the symbol perceived in the modulated signal, calculating a scalar relationship between a vector corresponding to the decided symbol and a reference, and deriving a signal quality associated with the modulated signal based on the scalar relationship. In accordance with either of these aspects, the derived signal quality can be used to alter one or more receiver characteristics of a receiver used to capture the modulated signal.

72 Claims, 5 Drawing Sheets

OTHER PUBLICATIONS

ANSI/IEEE Std 802.11, 1999 Edition, *Sponser LAN MAN Standards Committee of IEEE Computer Society*, "Part 11: Wireless LAN Medium Access Control (MAC) and Physical Layer (PHY) Specifications," Ch. 12 (pp. 138-146), Ch. 13 (pp. 147), Ch. 15 (pp. 195-223).

IEEE std. 802.11b—1999, *Sponsor LAN MAN Standards Committee of IEEE Computer Society*, "Part 11: Wireless LAN Medium Access Control (MAC) and Physical Layer (PHY) Specifications, Higher-Speed Physical Layer Extension in 2.4 GHz Band," Ch. 18 (pp. 11-58).

Geier, Jim, Wireless LANs, Second Edition, *Sams Publishing*, 2002, "Chapter 5: IEEE 802.11 Physical (PHY) Layer," pp. 126-151.

Bob Pearson, "Complementary Code Keying Made Simple" Application Note Nov. 2001, AN9850.0.

Anita Karve, Network Magazine, "802.11 and Spread Spectrum" Dec. 1, 1997, http://www.networkmagazine.com/article/NMG200726S001.

Kanokari Sarinnapakorn, "IEEE 802.11b 'High Rate' Wireless Local Area Netoworks" Mar. 15, 2001, http://alpha.fdu.edu/~kanokari/IEEE80211b.html.

Harold Davis, "Mighty Words Technical Briefings: Understanding 802.11b and Bluetooth" Mighty Words, Inc. 2001.

\* cited by examiner

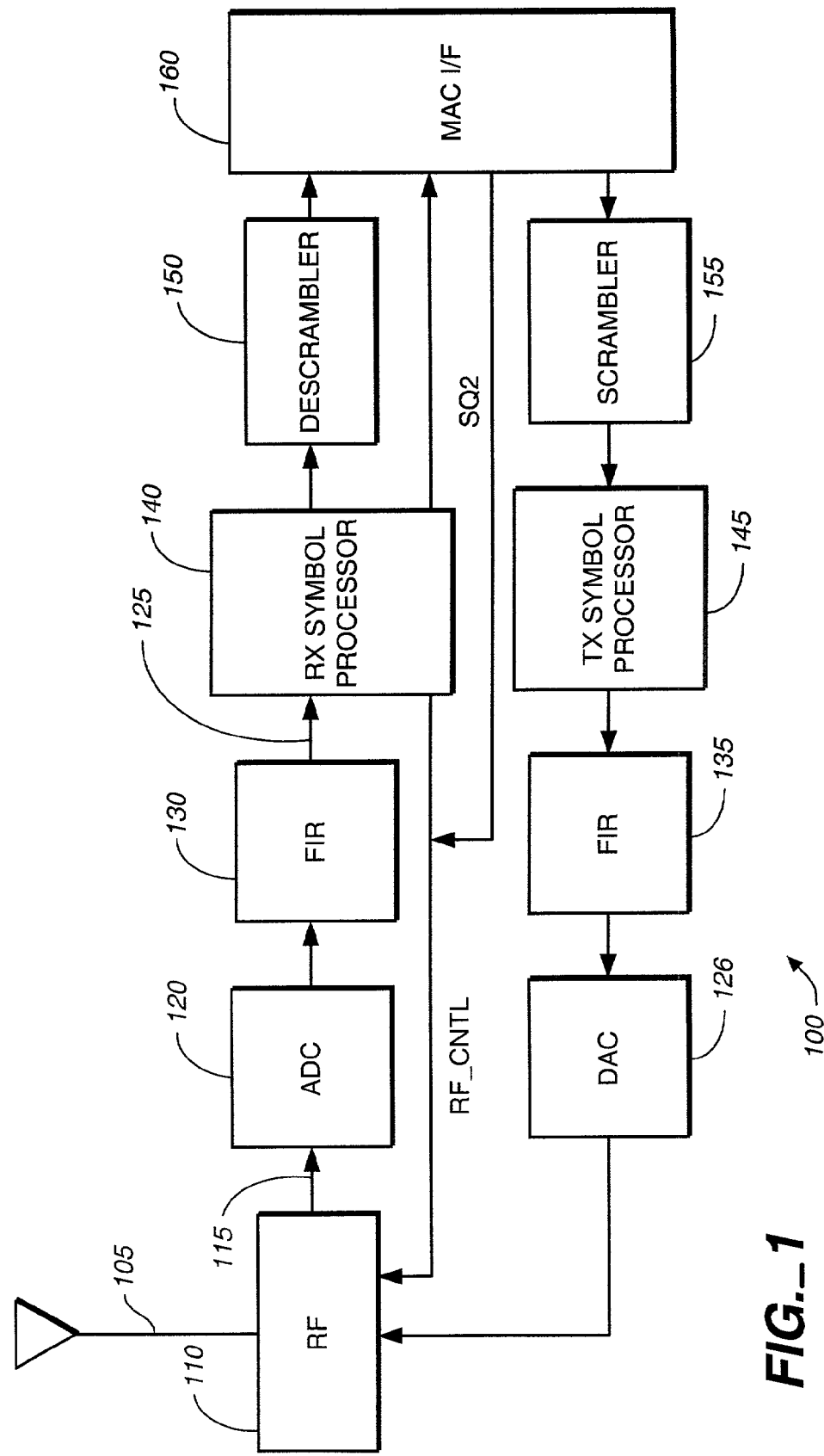
FIG._1

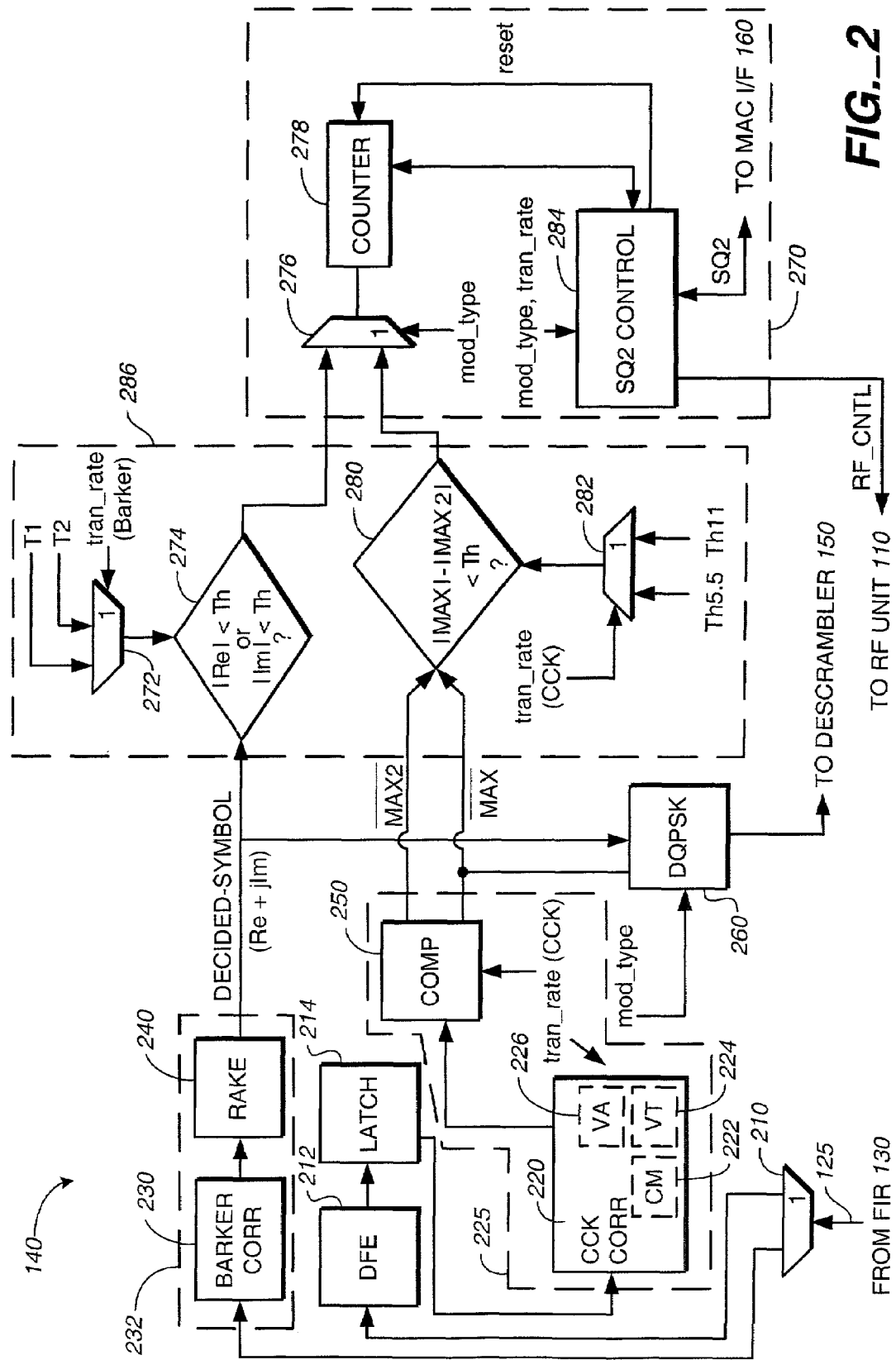
FIG._2

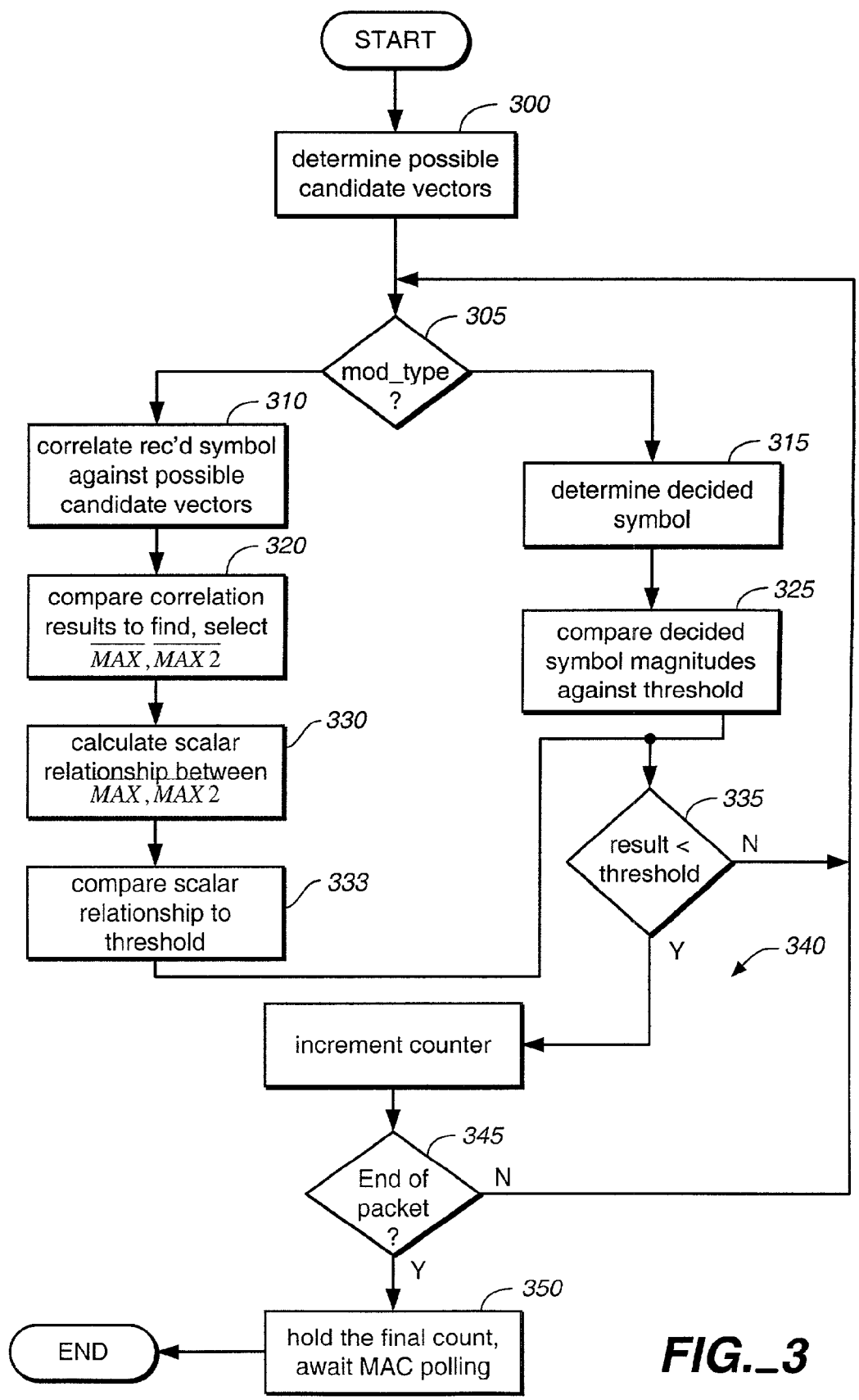
FIG._3

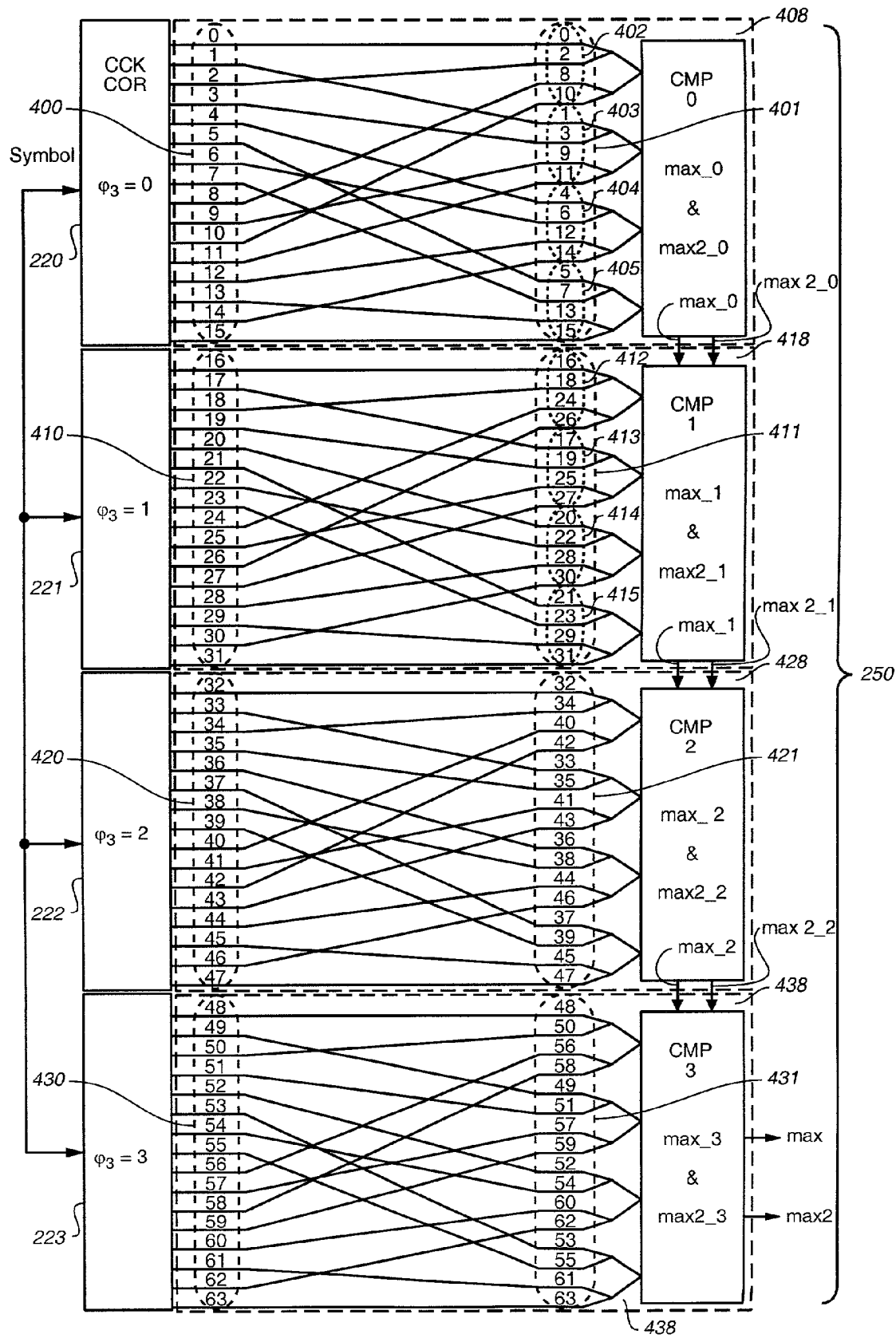
FIG._4

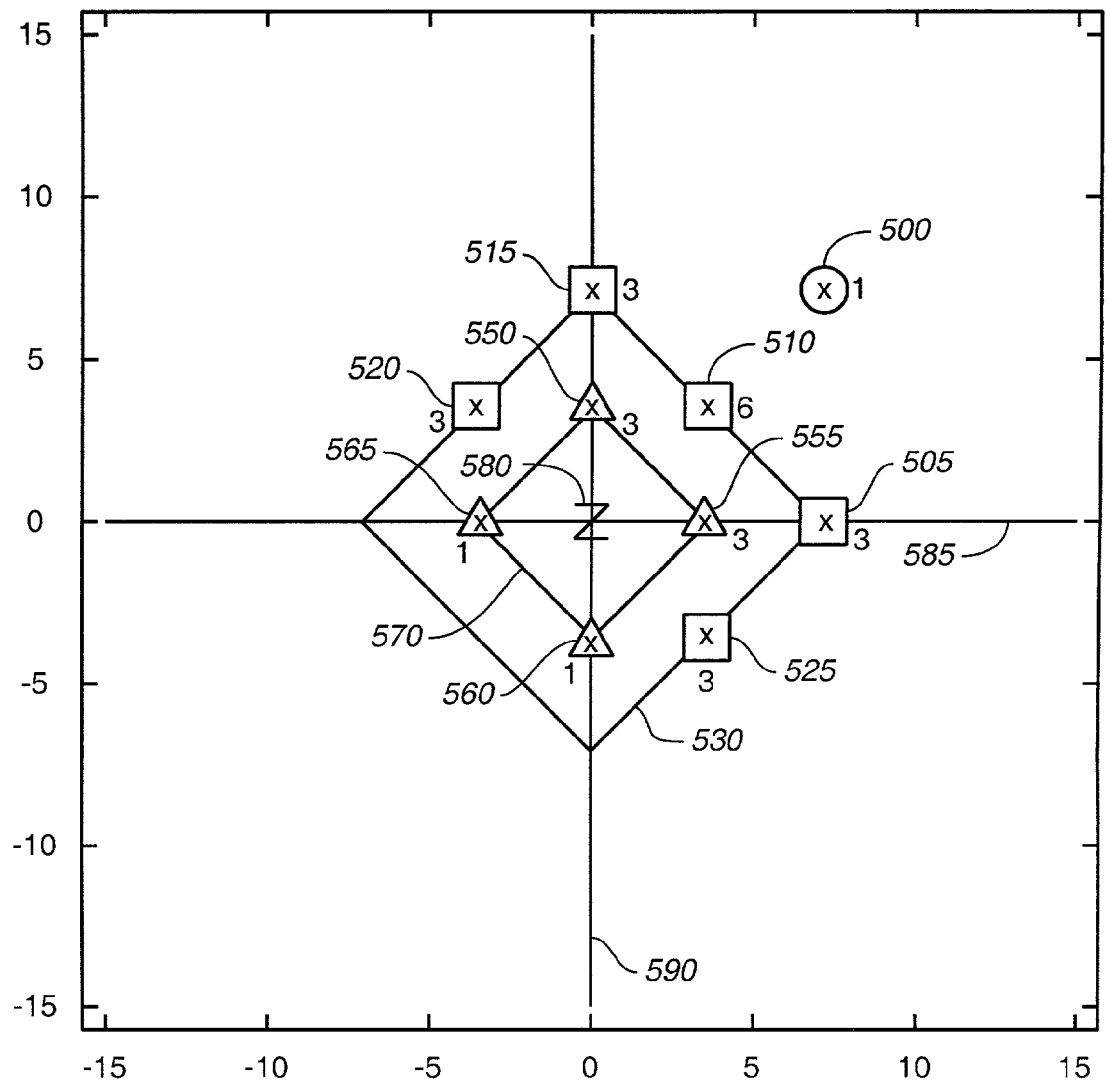
FIG._5

METHOD AND APPARATUS FOR DETERMINING SIGNAL QUALITY

RELATED APPLICATION

This application claims priority benefit under 35 U.S.C. § 119(e)(1) to U.S. Provisional Application No. 60/334,347, filed Nov. 29, 2001, entitled Method and Apparatus For Determining Signal Quality, which is incorporated herein fully by reference.

TECHNICAL FIELD

This invention is generally concerned with modulated signal receiver performance, and is particularly concerned with techniques for assessing perceived signal quality of a modulated signal derived from processing one or more coded symbols contained within the signal.

BACKGROUND OF THE INVENTION

The past few years has witnessed the ever-increasing availability of relatively cheap, low power wireless data communication services, networks and devices, promising near wire speed transmission and reliability. One technology in particular, described in the IEEE Standard 802.11b-1999 Supplement to the ANSI/IEEE Standard 802.11, 1999 edition, collectively incorporated herein fully by reference, and more commonly referred to as "802.11b" or "WiFi", has become the darling of the information technology industry and computer enthusiasts alike as a wired LAN/WAN alternative because of its potential 11 Mbps effective data transmission rate, ease of installation and use, and transceiver component costs make it a real and convenient alternative to wired 10 BaseT Ethernet and other cabled data networking alternatives. With 802.11b, workgroup-sized networks can now be deployed in a building in minutes, a campus in days instead of weeks since the demanding task of pulling cable and wiring existing structures is eliminated. Moreover, 802.11b compliant wireless networking equipment is backwards compatible with the earlier 802.11 1 M/2 Mbps standard, thereby further reducing deployment costs in legacy wireless systems.

802.11b achieves relatively high payload data transmission rates through the use of orthogonal class modulation in general, and, more particularly, 8-chip complementary code keying ("CCK") as a 11 MHz chipping rate. As such, bitstream data is mapped into nearly orthogonal sequences (or code symbols) to be transmitted, where each chip of the code symbol is quaternary phase modulated. An 801.11b compliant receiver correlates the received CCK modulated signal with 64 candidate waveforms to find the most likely code symbol, from which the bitstream data is recovered through reverse mapping. The high-rate physical layer PLCP preamble and header portions are still modulated using the 801.11 compliant Barker spreading sequence at an 11 MHz chipping rate, resulting in a 1 or 2 Mbps effective header and preamble transmission rate depending on whether DBPSK or DQPSK modulation is employed.

CCK was chosen in part because of its strong inherent resistance to multipath interference, which is likely to be encountered in the typical in-building deployment. Nevertheless, the confluence of strict power/noise limits specified for operation in the 2.4 GHz ISM band and megabit+ expected data throughput rates limits conventional 802.11b to just a 100 or so feet between stations, depending on the number of interposing radio obstructions and reflections.

Thus 802.11b remains susceptible to multipath interference, and to reception errors produced by inter-symbol ("ISI") and inter-chip interference("ICI") in particular. To combat this, designers have sought to improve receiver performance, at least with respect to CCK code symbol demodulation by using active equalization techniques. However, such techniques do not appear to take into account symbol processing reliability or errors, much less track such errors, nor alter the transmission environment when post symbol processing signal quality degrades.

SUMMARY OF THE INVENTION

To address these and other perceived shortcomings, the present invention is directed to a method, program product, and apparatus that determines a signal quality associated with a symbol modulated signal based on a scalar relationship based on at least one of a comparison of plural correlation candidate for a symbol in the modulated signal or a comparison of the vector corresponding to a decided symbol against a reference. In accordance with one aspect of the present invention, a method and apparatus are disclosed which involve determining maximum and next-maximum correlation candidates for a symbol perceived in the modulated signal, calculating the scalar relationship between the maximum and next-maximum correlation candidates, and deriving a signal quality associated with the modulated signal based on the scalar relationship.

In accordance with another aspect of the present invention, a method and apparatus are disclosed which involve determining a decided symbol for the symbol perceived in the modulated signal, calculating a scalar relationship between a vector corresponding to the decided symbol and a reference, and deriving a signal quality associated with the modulated signal based on the scalar relationship.

In accordance with either of these aspects, the derived signal quality can be used to alter one or more receiver characteristics of a receiver used to capture the modulated signal.

Additional aspects and advantages of this invention will be apparent from the following detailed description of preferred embodiments thereof, which proceeds with reference to the accompanying drawings.

BRIEF DESCRIPTION OF THE DRAWINGS

FIG. 1 is a functional block diagram of a transceiver 100 including an antenna and a data interface according to an embodiment of the invention.

FIG. 2 is a more detailed functional block diagram of the symbol processor shown in FIG. 1.

FIG. 3 is a flowchart illustrating signal quality determination according to an embodiment of the invention.

FIG. 4 diagrammatically illustrates modified sequential comparison processing used to determine the maximum and next-maximum correlation candidates according to an embodiment of the invention.

FIG. 5 is a plot of example correlation parameters generated by the CCK correlation unit 220 shown in FIG. 2 responsive to an 11 Mbps modulation rate.

DETAILED DESCRIPTION OF THE EMBODIMENTS

Turning first to FIG. 1, FIG. 1 is a functional block diagram of an IEEE 802.11b compliant transceiver 100 including an antenna 105 and data interface (e.g. MAC interface 160) according to an embodiment of the invention. This transceiver can form an operational part of a base station, network interface, or an information processing system as is well known in the art. As such, the transceiver includes duplex RF unit 110 for receiving and transmitting IEEE 802.11b Physical Layer Convergence Procedure ("PLCP") sublayer frames modulated onto a selected carrier frequency in the Industrial, Scientific and Medical ("ISM") band—2.4 Ghz as is well-known in the art via antenna 105. Though not shown in the figure, RF Unit 110 of the present embodiment includes selective diversity tuning circuitry and gain control to assist in tailoring RF unit 110 receiver performance in commonly encountered noisy or multipath environments. Also as part of the RF unit 110 are RF and IF frequency up/down converters used in modulating a baseband signal onto the selected carrier frequency for transmission, as well as receiving and extracting the baseband signal 115 (in analog form) from a tuned channel in the ISM band.

The ADC 120 and pulse-shaping FIR 130 complement the functions of the RF unit 110 in a known manner to convert the inbound and still analog baseband signal 115 into chipped digital form 125 suitable for coded symbol recognition, demodulation and processing gain signal quality determination consistent with the present invention as performed by the receive symbol processor 140.

It should be noted here that the digital baseband signal 125 presents the data of interest in the form of one or more coded symbols following one or more coding protocols, still requires further processing before e.g. received data can be extracted for use by a Media Access Controller ("MAC", not shown) and higher layers and applications executing on e.g. a local or remote information processor (not shown). To this end, the receive symbol processor 140 handles symbol decoding/demodulation functions consistent with 802.11b coding protocols, including Barker spreading and the aforementioned CCK protocols. In turn, consistent with the IEEE 802.11 and 802.11b standards, the descrambler 150 de-whitens inbound data recovered from the symbol processor 140 for delivery to a data interface such as the layer 2 MAC interface 160, the MAC itself and the aforementioned higher layers.

The transmit pathway includes the scrambler 155 that whitens outbound data presented by the MAC interface 160 on behalf of the MAC or higher layer protocols and applications it supports. The so-whitened outbound data is then coded, modulated and transmitted in sequence by the remaining components of the transmit pathway by the transmit symbol processor 145(encodes whitened outbound data the using one of the aforementioned symbol modulation techniques depending on the selected transmission rate), FIR 135 and DAC 126 (converts the so-coded outbound data to analog baseband form) and the RF modulator (not shown) and transmitter (not shown) of the RF unit 110.

The receive pathway, namely the receiver components of RF unit 110 (not shown), the ADC 120, the FIR 130, the receive symbol processor 140, and the descrambler 150 could be implemented in an alternative embodiment as a discrete receiver coupled to the MAC interface 160. Likewise, the aforementioned components of the transceiver transmit pathway can be implemented as a discrete transmitter coupled to the MAC interface 160.

Also, in this embodiment, the receive symbol processor 140 is responsible for determining and maintaining signal quality perceived at the post-processing or symbol decode/demodulation stage. In particular, the receive symbol processor 140 includes a signal quality derivation unit (FIG. 2) to develop and selectively maintain a measure of the signal quality representative of the received symbol modulated signal (either baseband and/or carrier modulated). This signal quality derivation unit 270, to be discussed in more detail with reference to FIG. 2, will provide this signal quality ("SQ2") to the MAC and higher layers, applications and/or services (collectively "MAC+layers") which the transceiver 100 supports via MAC interface 160. In an alternative embodiment, the receive symbol processor 140 may communicate with the MAC interface 160 "in-band" by including the signal quality information within the data decoded from one or more given symbols it delivers to the scrambler 150.

In the embodiment shown in FIG. 1, upon instruction by the MAC+layers as conveyed by MAC interface 160, the receive symbol processor 140 may also direct the RF unit 110 to alter one or more characteristics of the receiver environment within the command of the RF unit 110 (such as diversity tuning and/or gain control) in an effort to redress poor signal quality as reflected by e.g. SQ2. The receive symbol processor 140 does so by issuing an appropriate directive (labeled RF_CNTL) directly to the RF unit 110. In an alternative embodiment, the symbol processor may include the directive in-band as part of outband data that is coded and delivered to the FIR 130/DAC 120 tandem and then onto the RF unit 110.

A more detailed discussion of the relevant functions and composition of the receive symbol processor 140 according to the embodiment shown in FIG. 1 is now deemed appropriate. Referring now to FIG. 2, FIG. 2 illustrates in more detail the symbol decoding/demodulation and signal quality determination features of the receive symbol processor 140 according to the present embodiment. As shown in FIG. 2, the receive symbol processor includes four major components: 1) the decided symbol determination unit 232 (used to decide a Barker encoded symbol in the digital chipped baseband signal 125); 2) the candidate determination unit 225 (determines the maximum correlation and next-maximum correlation candidates as well as the decided CCK encoded symbol based on such candidates found in the signal 125); 3) a scalar calculation unit 286 which uses decided symbol and correlation candidate information to calculate a scalar relationship; and 4) a signal quality derivation unit 270 to derive a signal quality associated with the signal 125 from the scalar relationship(s) calculated by the scalar calculation unit 286. More detail on the composition and function of each of these components will be discussed in greater detail below.

Turning first to the determination units 232 and 235, the digital chipped baseband signal 125 is serially presented (on a per chip basis) by FIR 130 to the demux 210, where based on the expected modulation type ("mod_type" in FIG. 2) for the current symbol, directs the chipped baseband signal to either the Barker correlator 230 of the decided symbol determination unit 232 or the CCK correlator 220 of the candidate determination unit 225. In particular, if the current symbol is positioned within the PLCP header or preamble, or represents PLCP frame payload (e.g. MAC Payload Data Unit or MPDU) modulated at 802.11 base rates (1 Mbps or 2 Mbps), such symbol is decoded using a Barker mode demodulation pathway (Barker correlator 230 in combination with RAKE filter 240) with the decided symbol determination unit 232. If, however, the symbol represents high-rate (e.g. 5.5 or 11 Mbps) PLCP payload/MPDU data, the symbol is instead decoded using a CCK demodulation pathway DFE 212, serial-to-parallel latch 214, CCK correlator 220 and comparator 250 collectively within the candidate determination unit 225.

Considering first the situation where Barker demodulation is needed, the Barker correlator 230-RAKE filter 240 produces a decided symbol in complex vector form (Re+jIm), as is well-known in the art. This decided symbol is labeled in FIG. 2 as DECIDED_SYMBOL. The RAKE filter 240 presents the decided symbol vector to the DQPSK demodulator 260 for convectional phase decoding considerations as well as the scalar calculation unit 286 and specifically to comparison unit 274 thereof. The fully symbol decoded data is generated by the DQPSK demodulator 260 and sent to the descrambler to regenerate user data bits (i.e. the data of interest).

The comparison unit 274 of the scalar calculates unit 286 assesses the Barker mode decided symbol in this embodiment by comparing the magnitudes of the real and imaginary parts of the decided symbol vector against one of two selectable thresholds, Th1 (for DBPSK 1 Mbps transmission rate) and Th2 (for DQPSK 2 Mbps transmission rate) In one implementation, Th1 is 0.25 and Th2 is 0.375. Thus, if the magnitude of either the real or imaginary components of the deiced symbol is less than Th1 or Th2 respectively, it is determined that the post-processing signal quality has degraded and so comparison unit 274 yields true and a counter 278 of the signal quality derivation unit 270 (accessed via mux 276) is incremented. Also, in this embodiment, the MAC I/F 160 and MAC+layers serviced by the transceiver 110 are notified of the signal quality degradation through issuance of the SQ2 signal by the SQ2 control unit 284 of the signal quality derivation unit 270. Alteratively, other techniques for apprising external resources of the perceived degradation in signal quality may be used, such as making the contents of the counter 278 accessible upon request or sending an appropriate message downstream as part of or in addition to the decoded data sent to descramble 150.

Considering now where the current symbol is CCK-encoded (i.e. mod_type=CCK), the CCK denudation pathway of the candidate determination unit 225 is instead selected. Still referring to FIG. 2, the chips of the current symbol are fed serially from the output of the demux 210 to the decision feedback equalizer 212 for equalization purposes and then on to serial to parallel latch 214. Digital feedback equalization techniques such as disclosed in U.S. patent application Ser. No. 10/080,826, filed Feb. 21, 2002, entitled DECODING METHOD AND APPARATUS which is incorporated herein fully by reference, may be used here.

Once all chips defining the current CCK modulated symbol have been equalized and accumulated by the latch 214, the latch releases them in parallel to the CCK correlator 220 of the candidate determination unit 225. The CCK correlator 220 correlates the chips of the current symbol against a plurality of possible candidate vectors, each representing a possible CCK symbol to decide which symbol was received. The plurality of possible candidate vectors is defined here as a subset of the ordered set of 64 CCK symbol vectors selected based on at least one characteristic of the modulated signal bearing the symbol of interest, such as the CCK modulation transmission rate (here either 5.5 Mbps or 11 Mbps, labeled as tran_rate(CCK) in FIG. 2). For example, it is known that only 4 out of the 64 CCK symbol vectors are possible candidates in 5.5 Mbps transmission rate, so only these symbol vectors need be correlated against the input chips of the symbol. However, in 11 Mbps situations, all 64 CCK symbol vectors are valid, and thus the possible candidate vectors expands to the whole set of CCK symbol vectors.

Consistent with the present embodiment, several techniques may be used to single out the possible candidate vectors, including parallel correction against the entire set of CCK symbol vectors followed by selective comparison of correlation results involving only the possible candidate vectors, flagging the possible candidates presented in a larger table accommodating the entire set of CCK symbol vectors and correcting only these candidates against the latched symbol chips, etc. Herein, the set of CCK symbol vectors may be conveniently set forth in a lookup table such as vector table ("VT") 224 within or accessible to the CCK correlator 220, and the subset of possible candidate vectors may be flagged therein by an internal candidate manager agent 222.

Though not required, the CCK correlator 220 and more specifically the vector analysis unit 226 thereof here correlates the chips of the symbol by computing the dot product between these chips and at least the possible candidate vectors. A resulting correlation parameter is generated by this unit 226 for each of the possible candidate vectors, consisting of the sum of the real and imaginary scalar results of the dot product process. As is known in the art, the candidate vector whose correlation parameter has the higher value is considered to be the "most correlated vector", the "best match" or the "maximum correlation candidate" (as is used herein and labeled "MAX" in FIG. 2). The maximum correlation candidate index is then mapped to the data bits d2-d7, and along with data bits d0-d1 resolved by the DQPSK demodulator 260, completes the data octet corresponding to the current CCK symbol. This octet is sent to the descrambler 150 to complete recovery of the data in a known manner.

More detail on correlation processing may be found in e.g. U.S. patent application Ser. No. 10/092,971, filed Mar. 5, 2002naming Guorong Hu, Yungping Hsu, and Weishi Feng as co-inventors and entitled METHOD AND APPARATUS FOR COMPLEMENTARY CODE KEYING, which is incorporated herein fully by reference.

As discussed above, signal quality consistent with the present embodiment may be realized through comparative vector analysis of the maximum correlation candidate and the next-maximum correlation candidate(s), defined herein as one or more possible candidate vectors having the relatively next-highest correction parameter value(labeled "MAX2"). In particular, a scalar relationship between the maximum and next-maximum correlation candidates is calculated in order to derive the measure of signal quality.

To better understand the relationship between the maximum correlation candidate and the next-maximum correlation candidate, consider a sample plot of correlation parameter produced by a CCK correlator 220 on a complex plane, wherein angle $\phi 1=1+j$, $\phi 2=\phi 3=\phi 4=0$ at 11 Mbps transmission rate, as depicted in FIG. 5. The maximum correlation candidate vector out of 64 possible candidate vectors has a correlation parameter of 16 (|8|+|8| point 500), each of 18 next-maximum correlation candidate vectors (not every matching correlation parameter is shown) has a correlation parameter of 8 (e.g. |8|+|0|—point 505, |4|+|4|—point 510, |0|+|8|—point 515, |−4|+|4|—point 520, |4|+|−4|—point 525 along outer diamond 530. In addition, there are 8 possible candidate vectors with a correlation parameter of 4 (e.g. points 550, 555, 560, 565 along inner diamond 570), and finally 37 candidates 580 with a correlation parameter of 0. Details of how to find the next-maximum correlation candidate in accordance with the present embodiment will be discussed below with reference to FIG. 4.

In the embodiment of FIG. 2, the scalar calculation unit 286 and the comparison unit 280 thereof, in particular, calculates a scalar relationship for the current CCK encoded symbol signal quality for CCK encoded symbols by comparing the difference between the correlation parameters generated by the vector analysis unit 226 of the CCK correlator 220 for the maximum and next-maximum correlation candidates with a preselected threshold, here Th5.5 as 0.5 (5.5 Mbps transmission rate) and Th11 (11 Mbps transmission rate) as 0.375. If this difference (a type of scalar relationship) is less than the respective threshold based on the present transmission rate, the signal quality is perceived to have degraded and the comparison unit 280 instructs the counter 278 of the signal quality derivation unit 270 to increment (again through mux 276). Likewise, the SQ2 control unit 284 of the signal quality derivation unit 270 notifies the MAC interface 160 either directly or indirectly that the signal quality has degraded, and may, upon direction of the MAC or higher layers or applications the transceiver is servicing, may direct the RF unit 110 to alter one or more receiver characteristics.

It should be noted that the components of the receive symbol processor 140, including but not limited to, the aforementioned decided symbol determination unit 232, the candidate determination unit 225, the scalar calculation unit 286, and the signal quality derivation unit 270, in the embodiment depicted in FIG. 2 may be implemented as decisional logic circuitry capable of performing the signal quality determination functions described herein. In fact, any combination of decisional circuitry, including combinations involving one or more intelligent circuits such as a state machine, and/or general-purpose or specific purpose information processor(s) programmed in accordance with the disclosed components 232, 225, 286, and 270 or as specified in the flowchart of FIG. 3, may be utilized to carry out signal quality determination according to the present invention as long as chipped symbol decoding rates compliant with IEEE 802.11 and/or 802.11b can be supported.

Although not shown in the figures, consistent with the present embodiment the MAC+layers serviced by the transceiver 100 may communicate with the corresponding transmitter (transmitter generating the inbound carrier signal) to alter transmit characteristics such as power level and/or transmission rate in an effort to improve signal quality. It may do so by embedding appropriate messages in the e.g. MPDU or PLCP preamble/header portions that the corresponding transmitter PHY or MAC may decode, as one with ordaining skill in the art will appreciate. Moreover, the SQ2 control unit 284 may inform these higher layer services and applications that the signal quality has improved, if for example, it is determined that the calculated scalar relationship in either mode exceeds the appropriate threshold.

Moreover, although the present embodiment contemplates certain types of scalar relationships (e.g. Barker mode—magnitude of the real and imaginary components of the decided symbol vector which is essentially a scalar difference between the decided symbol vector and nil, or CCK mode—difference in correlation parameters for the maximum and next-maximum correlation candidates), other types of scalar relationships may be used consistent with the present invention in order to derive an appropriate measure of signal quality based on perceived processing gain reliability and/or errors. For example, in CCK mode, a scalar or Euclidean distance between maximum and next-maximum correlation candidate vectors may be calculated and thresholded to determine if there's signal quality problem (again a higher number indicates a more reliable correlation decision has been reached.

Turning now to FIG. 3, FIG. 3 is a flowchart describing post symbol processing signal quality according to another embodiment of the invention. In this embodiment, the receive symbol processor 140 may include an ASIC and/or a programmed information processor such as a microporoccor or microcontroller designed to execute the sequence of steps described in the flowchart of FIG. 3, and or any subset thereof in combination with one or more components of the receive symbol processor 140 described above.

FIG. 4 illustrates comparison processing carried out by the comparator 250 which leverages the relative distance characteristics of CCK referred to herein as modified sequential comparison processing. First, consider a brute-force or sequential comparison processing in which the correlation parameters generated by the CCK correlation 220 are compared in squential CCK symbol vector order to find the maximum correlation candidate from the subset of possible candidate vectors, which is the case of 11 Mbps transmission rate, requires comparison of 64 correlation parameters. Thus, 63 comparisons must be made to find the maximum correlation candidate. Then, one or more of the next maximum correlation candidates may be found by disregarding the correlation parameter for the maximum correlation candidate and again looking for those possible candidate vectors which have the largest remaining correction parameters. Using this technique, another 62 comparisons must be made.

However, by exploiting relative distance relationships within subsets of CCK vectors, one can group together and re-order comparions according to a second order (depicted as order 401, 411, 421, 431 handled by group selection logic 408, 418, 428, or 438 respectively). Again assuming the subset of possible candidate vectors corresponds with the 64 member set of CCK symbol vectors, comparison can be localized to within 4 groups (400, 410, 420 and 430) of 16 sequential vectors (0-15, 16-31, 32-47, and 48-63) differentiated by the value of $\phi 3$ using the aforementioned group selection logic 408, 418, 428, and 438 respectively, and can be further localized within each 16 vector group to 4 subgroups of four vector comparisons. Because of this grouping approach and the reordered initial comparisons, each four vector comparison subgroup cannot provide both the maximum and the next maximum correlation candidate, since each vector in each subgroup are "uncorrelated" with each other—in other words, they are defined by a relative maximum Euclidean distance from another. If one of the vectors in one of these subgroups is found to be MAX, it is very unlikely that MAX2 will be in this subgroup. By using this approach, the total number of comparisons can be reduced from 125 to 73.

Consider first the set of possible candidate vectors defined where $\phi 3=0$. In this case, group of vectors 0-15 (group 400) are compared out of sequence using order 401 provided by group selection logic 408. As shown in FIG. 4, the reordered vector subgroups include 0, 2, 8, 10 (subgroup 402), 1, 3, 9, 11 (subgroup 403), 4, 6, 12, 14 (subgroup 404), and 5, 7, 13, 15 (subgroup 405). For each subgroup, the correlation parameters of the first two and the last two members are compared (e.g. 0-2 and 8-10 for subgroup 402, 1-3 and 9-11 for subgroup 403, 4-6 and 12-14 for subgroup 404 and 5-7 and 13-15 for subgroup 405), and then the larger of each pair is then compared to find a subgroup maximum correlation parameter. The local maximum and next maximum correlation parameters (labeled as max_0 and max2_0 in FIG. 4 respectively) for vector group 400 are then selected using sequential comparison of the four subgroup maximum correlation parameters.

The local maximum for the remaining vector groups 410, 420, and 430 can be then determined in sequence taking into consideration the following observations. First, except for the first group 400, the local maximum and next maximum (max__1, max2__1 in group 410; max__2, max2__2 in group 420; max__3, max2__3) are selected using sequential comparison taking into account the respective four subgroup maximum correlation parameters along with the max and max2 correlation parameters from the immediately preceding group. For example, in the case of vector group 410, the subgroup maximum correlation parameters for subgroups 412, 413, 414, and 415 are sequentially compared against the max__0 and max2__0 values to find the max__1 and max2__1 correlation parameters.

According to this embodiment, the modified sequential comparison process continues until the maximum max__3 and next maximum max2__3 correlation parameters are obtained with reference to subgroup 430. In this process, the possible candidate vector corresponding to the max__3 correlation parameter is deemed the maximum correlation candidate and the possible candidate vector(s) corresponding to the max2__3 correlation parameter are deemed the next maximum correction candidate.

It will be obvious to those having ordinary skill in the art that many changes may be made to the details of the above-described embodiments of this invention without departing from the underlying principles thereof. For example, though the above-described embodiments are directed to implementations compliant with IEEE 802.11 and 802.11b standard, the teachings of the present invention are not intended to be so limiting and in fact post symbol processing signal quality consistent with the present invention can be derived in other coded symbol reception scenarios and environments, whether based on RF transmission or otherwise. The scope of the present invention should, therefore, be determined only by the following claims.

What is claimed is:

1. A method comprising:
   determining maximum and next-maximum correlation candidates for a symbol perceived within a modulated signal;
   calculating a scalar relationship between the maximum and next-maximum correlation candidates;
   deriving a signal quality associated with the modulated signal based on the scalar relationship; and
   altering a receiver characteristic based on said derived signal quality.

2. The method of claim 1, wherein
   the symbol is defined by a plurality of chips; and
   wherein said determining step comprises:
      correlating the chips of the symbol against a plurality of possible candidate vectors;
      first selecting as the maximum correlation candidate one of the plurality of possible candidate vectors most correlated to the chips of the symbol pursuant to said correlating step; and
      second selecting as the next-maximum correlation candidate at least one of the plurality of possible candidate vectors other than the maximum correlation candidate most relatively correlated to the chips of the symbol pursuant to said correlating step.

3. The method of claim 2, further comprising deriving the plurality of possible candidate vectors from an ordered set of symbol vectors based on at least one characteristic of the modulated signal, the ordered set of symbol vectors being ordered according to a first order.

4. The method of claim 3, wherein
   said correlating step includes the step of generating a correlation parameter for each of the plurality of possible candidate vectors with respect to the chips of the symbol; and
   wherein said first and second selecting steps comprises assessing the correlation parameters using one of:
      a sequential comparison process following the first order; and
      a modified sequential comparison process following a second order associated with the set of symbol vectors, the second order being dissimilar from the first order.

5. The method of claim 4, wherein the second order is defined with respect to at least one subset of the set of symbol vectors, the subset including plural members of the set of symbol vectors selected in accordance with a relative distance relationship therebetween.

6. The method of claim 1, wherein the symbol comprises a complementary code keyed symbol compliant with IEEE 802.11b (1999).

7. The method of claim 1, wherein the scalar relationship comprises at least one of:
   a distance between the maximum and next-maximum correlation candidates; and
   a magnitude difference between the maximum and next-maximum correlation candidates.

8. The method of claim 1, further comprising:
   receiving the modulated signal in accordance with a receiver characteristic; and
   modifying the receiver characteristic based on the derived signal quality.

9. A method comprising:
   determining a decided symbol for a symbol perceived within a modulated signal;
   calculating a scalar relationship between a vector corresponding to the decided symbol and a reference;
   deriving a signal quality associated with the modulated signal based on the scalar relationship; and
   altering a receiver characteristic based on said derived signal quality.

10. The method of claim 9, wherein said deriving step comprises
    comparing the scalar relationship to a threshold;
    generating a first signal if the scalar relationship is less than the threshold; and
    generating a second signal if the scalar relationship at least meets the threshold.

11. The method of claim 10, further comprising:
    receiving the modulated signal in accordance with a receiver characteristic; and
    modifying the receiver characteristic based if the derived signal quality comprises the first signal.

12. The method of claim 9, further comprising:
    receiving the modulated signal in accordance with a receiver characteristic; and
    modifying the receiver characteristic based on the derived signal quality.

13. The method of claim 9, wherein the symbol comprises a complementary code keyed symbol complaint with IEEE 802.11b (1999).

14. A computer-readable storage medium that stores a program code that causes an information processor to perform at least the following steps, the steps comprising:

determining maximum and next-maximum correlation candidates for a symbol perceived within a modulated signal;

calculating a scalar relationship between the maximum and next-maximum correlation candidates;

deriving a signal quality associated with the modulated signal based on the scalar relationship; and altering a receiver characteristic based on said derived signal quality.

15. The computer-readable storage medium of claim 14, wherein the symbol is defined by a plurality of chips; and wherein said determining step comprises:

correlating the chips of the symbol against a plurality of possible candidate vectors;

first selecting as the maximum correlation candidate one of the plurality of possible candidate vectors most correlated to the chips of the symbol pursuant to said correlating step; and second selecting as the next-maximum correlation candidate at least one of the plurality of possible candidate vectors other than the maximum correlation candidate most relatively correlated to the chips of the symbol pursuant to said correlating step.

16. The computer-readable storage medium of claim 15, further comprising computer readable program code causing the information processor to perform deriving the plurality of possible candidate vectors from an ordered set of symbol vectors based on at least one characteristic of the modulated signal, the ordered set of symbol vectors being ordered according to a first order.

17. The computer-readable storage medium of claim 16, wherein said correlating step includes the step of generating a correlation parameter for each of the plurality of possible candidate vectors with respect to the chips of the symbol; and wherein said first and second selecting steps comprises assessing the correlation parameters using one of:

a sequential comparison process following the first order; and a modified sequential comparison process following a second order associated with the set of symbol vectors, the second order being dissimilar from the first order.

18. The computer-readable storage medium of claim 17, wherein the second order is defined with respect to at least one subset of the set of symbol vectors, the subset including plural members of the set of symbol vectors selected in accordance with a relative distance relationship therebetween.

19. The computer-readable storage medium of claim 14, wherein the symbol comprises a complementary code keyed symbol compliant with IEEE 802.11b (1999).

20. The computer-readable storage medium of claim 14, wherein the scalar relationship comprises at least one of:

a distance between the maximum and next-maximum correlation candidates; and a magnitude difference between the maximum and next-maximum correlation candidates.

21. The computer-readable storage medium of claim 14, further comprising computer readable program code causing the information processor to perform at least the following additional steps, the steps comprising:

receiving the modulated signal in accordance with a receiver characteristic; and modifying the receiver characteristic based on the derived signal quality.

22. A computer-readable storage medium that stores program code that causes an information processor to perform at least the following steps, the steps comprising:

determining a decided symbol for a symbol perceived within the modulated signal;

calculating a scalar relationship between a vector corresponding to the decided symbol and a reference;

deriving a signal quality associated with the modulated signal based on the scalar relationship; and altering a receiver characteristic based on said derived signal quality.

23. The computer-readable storage medium of claim 22, wherein said deriving step comprises comparing the scalar relationship to a threshold;

generating a first signal if the scalar relationship is less than the threshold; and generating a second signal if the scalar relationship at least meets the threshold.

24. The computer-readable storage medium of claim 23, further comprising computer readable program code causing the information processor to perform at least the following additional steps, the steps comprising:

receiving the modulated signal in accordance with a receiver characteristic; and modifying the receiver characteristic based if the derived signal quality comprises the first signal.

25. The computer-readable storage medium of claim 22, further comprising computer readable program code causing the information processor to perform at least the following additional steps, the steps comprising:

receiving the modulated signal in accordance with a receiver characteristic; and modifying the receiver characteristic based if the derived signal quality comprises the first signal.

26. The computer-readable storage medium of claim 22, wherein the symbol comprises a complementary code keyed symbol compliant with IEEE 802.11b (1999).

27. A symbol processor operable upon a symbol modulated signal, the symbol processor comprising:

a candidate determination unit to determine maximum and next-maximum correlation candidates for a symbol perceived within the modulated signal;

a scalar calculation unit coupled to said candidate determination unit to calculate a scalar relationship between the maximum and next-maximum correlation candidates;

a signal quality derivation unit coupled to said scalar calculation unit to derive a signal quality associated with the modulated signal based on the scalar relationship; and at least one of a radio frequency (RF) unit and a media access controller (MAC) interface to alter a receiver characteristic based on said derived signal quality.

28. The symbol processor of claim 27, wherein the symbol is defined by a plurality of chips; and wherein said candidate determination unit comprises:

a correlator to correlate the chips of the symbol against a plurality of possible candidate vectors; and a comparator coupled to said correlator, the comparator capable of selecting as the maximum correlation candidate one of the plurality of possible candidate vectors most correlated to the chips of the symbol and capable of selecting as the next-maximum correlation candidate at least one of the plurality of possible candidate vectors other than the maximum correlation candidate most relatively correlated to the chips of the symbol.

29. The symbol processor of claim 28, wherein the correlator further comprises a candidate manager to derive the plurality of possible candidate vectors from an ordered set of symbol vectors based on at least one characteristic of the modulated signal, the ordered set of symbol vectors being ordered according to a first order.

30. The symbol processor of claim 29, wherein
said correlator includes a vector analysis unit coupled to said candidate selection logic to generate a correlation parameter for each of the plurality of possible candidate vectors with respect to the chips of the symbol; and
wherein said comparator comprises selection logic to assess the correlation parameters using one of:
a sequential comparison process following the first order; and
a modified sequential comparison process following a second order associated with the set of symbol vectors, the second order being dissimilar from the first order.

31. The symbol processor of claim 30, wherein the second order is defined with respect to at least one subset of the set of symbol vectors, the subset including plural members of the set of symbol vectors selected in accordance with a relative distance relationship therebetween.

32. The symbol processor of claim 27, wherein the symbol comprises a complementary code keyed symbol compliant with IEEE 802.11b (1999).

33. The symbol processor of claim 27, wherein the scalar relationship comprises at least one of:
a distance between the maximum and next-maximum correlation candidates; and
a magnitude difference between the maximum and next-maximum correlation candidates.

34. The symbol processor of claim 27, further comprising:
a decided symbol determination unit coupled to said scalar calculation unit to determine a decided symbol for the symbol perceived within the modulated signal; and
wherein said scalar calculation unit calculate a second scalar relationship between a vector corresponding to the decided symbol and a reference; and
wherein said signal quality derivation unit derives a second signal quality associated with the modulated signal based on the second scalar relationship.

35. The symbol processor of claim 34, wherein said scalar calculation unit comprises a comparison unit coupled to said decided symbol determination unit to compare the scalar relationship to a threshold and generate one of a first signal if the second scalar relationship is less than the threshold and a second signal if the second scalar relationship at least meets the threshold.

36. A receiver, comprising:
a receive unit to receive a modulated signal in accordance with a receiver characteristic;
a symbol processor coupled to the receive unit, comprising:
a candidate determination unit to determine maximum and next-maximum correlation candidates for a symbol perceived within the modulated signal;
a scalar calculation unit coupled to said candidate determination unit to calculate a scalar relationship between the maximum and next-maximum correlation candidates; and
a signal quality derivation unit coupled to said scalar calculation unit to derive a signal quality associated with the modulated signal based on the scalar relationship; and
at least one of a radio frequency (RF) unit and a media access controller (MAC) interface to alter a receiver characteristic based on said derived signal quality.

37. The receiver of claim 36, further comprising modification logic responsive to said symbol processor to modify the receiver characteristic based on the derived signal quality.

38. The receiver of claim 36, wherein
the symbol is defined by a plurality of chips; and
wherein said candidate determination unit comprises:
a correlator to correlate the chips of the symbol against a plurality of possible candidate vectors; and
a comparator coupled to said correlator, the comparator capable of selecting as the maximum correlation candidate one of the plurality of possible candidate vectors most correlated to the chips of the symbol and capable of selecting as the next-maximum correlation candidate at least one of the plurality of possible candidate vectors other than the maximum correlation candidate most relatively correlated to the chips of the symbol.

39. The receiver of claim 38, wherein the correlator further comprises a candidate manager to derive the plurality of possible candidate vectors from an ordered set of symbol vectors based on at least one characteristic of the modulated signal, the ordered set of symbol vectors being ordered according to a first order.

40. The receiver of claim 39, wherein
said correlator includes a vector analysis unit coupled to said candidate selection logic to generate a correlation parameter for each of the plurality of possible candidate vectors with respect to the chips of the symbol; and
wherein said comparator comprises selection logic to assess the correlation parameters using one of:
a sequential comparison process following the first order; and
a modified sequential comparison process following a second order associated with the set of symbol vectors, the second order being dissimilar from the first order.

41. The receiver of claim 40, wherein the second order is defined with respect to at least one subset of the set of symbol vectors, the subset including plural members of the set of symbol vectors selected in accordance with a relative distance relationship therebetween.

42. The receiver of claim 36, wherein the symbol comprises a complementary code keyed symbol compliant with IEEE 802.11b (1999).

43. The receiver of claim 36, wherein the scalar relationship comprises at least one of:
a distance between the maximum and next-maximum correlation candidates; and
a magnitude difference between the maximum and next-maximum correlation candidates.

44. The receiver of claim 36, wherein said symbol processor further comprises:
a decided symbol determination unit coupled to said scalar calculation unit to determine a decided symbol for the symbol perceived within the modulated signal; and
wherein said scalar calculation unit calculates a second scalar relationship between a vector corresponding to the decided symbol and a reference; and wherein said signal quality derivation unit derives a second signal quality associated with the modulated signal based on the second scalar relationship.

45. The receiver of claim 44, wherein said scalar calculation unit comprises a comparison unit coupled to said decided symbol determination unit to compare the scalar relationship to a threshold and generate one of a first signal if the second scalar relationship is less than the threshold and a second signal if the second scalar relationship at least meets the threshold.

46. A transceiver, comprising:
a transmitter;
a receiver to receive a modulate signal in accordance with a receiver characteristic;
a symbol processor coupled to said receiver and said transmitter, said symbol processor comprising:
   a candidate determination unit to determine maximum and next-maximum correlation candidates for a symbol perceived within the modulated signal;
   a scalar calculation unit coupled to said candidate determination unit to calculate a scalar relationship between the maximum and next-maximum correlation candidates; and
   a signal quality derivation unit coupled to said scalar calculation unit to derive a signal quality associated with the modulated signal based on the scalar relationship; and
   at least one of a radio frequency (RF) unit and a media access controller (MAC) interface to alter a receiver characteristic based on said derived signal quality.

47. A base station, comprising:
an antenna;
a transmitter and a receiver coupled to said antenna, said receiver comprising:
a receive unit to receive a modulated signal in accordance with a receiver characteristic;
a symbol processor coupled to said receive unit, said symbol processor comprising:
   a candidate determination unit to determine maximum and next-maximum correlation candidates for a symbol perceived within the modulated signal;
   a scalar calculation unit coupled to said candidate determination unit to calculate a scalar relationship between the maximum and next-maximum correlation candidates; and
   a signal quality derivation unit coupled to said scalar calculation unit to derive a signal quality associated with the modulated signal based on the scalar relationship; and
   at least one of a radio frequency (RF) unit and a media access controller (MAC) interface to alter a receiver characteristic based on said derived signal quality.

48. A network interface, comprising:
a data interface;
a receiver coupled to said data interface, said receiver comprising:
a receive unit to receive a modulated signal in accordance with a receiver characteristic; and
a symbol processor coupled to said receive unit, said symbol processor comprising:
   a candidate determination unit to determine maximum and next-maximum correlation candidates for a symbol perceived within the modulated signal;
   a scalar calculation unit coupled to said candidate determination unit to calculate a scalar relationship between the maximum and next-maximum correlation candidates; and
   a signal quality derivation unit coupled to said scalar calculation unit to derive a signal quality associated with the modulated signal based on the scalar relationship; and
   at least one of a radio frequency (RF) unit and a media access controller (MAC) interface to alter a receiver characteristic based on said derived signal quality.

49. An information processing system, comprising:
an information processor coupled to a data interface;
a receiver coupled to said data interface, said receiver comprising
   a receive unit to receive a modulated signal in accordance with a receiver characteristic; and
   a symbol processor coupled to said receive unit, said symbol processor comprising:
      a candidate determination unit to determine maximum and next-maximum correlation candidates for a symbol perceived within the modulated signal;
      a scalar calculation unit coupled to said candidate determination unit to calculate a scalar relationship between the maximum and next-maximum correlation candidates; and
      signal quality derivation unit coupled to said scalar calculation unit to derive a signal quality associated with the modulated signal based on the scalar relationship; and
      at least one of a radio frequency (RF) unit and a media access controller (MAC) interface to alter a receiver characteristic based on said derived signal quality.

50. A symbol processor operable upon a symbol modulated signal, the symbol processor comprising:
means for determining maximum and next-maximum correlation candidates for a symbol perceived within the modulated signal;
means for calculation a scalar relationship between the maximum and next-maximum correlation candidates;
means for deriving a signal quality associated with the modulated signal based on the scalar relationship; and
means for altering a receiver characteristic based on said derived signal quality.

51. The symbol processor of claim 50, wherein
the symbol is defined by a plurality of chips; and
wherein said determining means comprises:
   means for correlating the chips of the symbol against a plurality of possible candidate vectors; and
   means for selecting as the maximum correlation candidate one of the plurality of possible candidate vectors most correlated to the chips of the symbol and capable of selecting as the next-maximum correlation candidate at least one of the plurality of possible candidate vectors other than the maximum correlation candidate most relatively correlated to the chips of the symbol.

52. The symbol processor of claim 51, further comprising means for deriving the plurality of possible candidate vectors from an ordered set of symbol vectors based on at least one characteristic of the modulated signal, the ordered set of symbol vectors being ordered according to a first order.

53. The symbol processor of claim 52, wherein
said correlating means includes means for generating a correlation parameter for each of the plurality of possible candidate vectors with respect to the chips of the symbol; and
wherein said selecting means includes means for assessing the correlation parameters using one of:
a sequential comparison process following the first order; and
a modified sequential comparison process following a second order associated with the set of symbol vectors, the second order being dissimilar from the first order.

54. The symbol processor of claim 53, wherein the second order is defined with respect to at least one subset of the set of symbol vectors, the subset including plural members of the set of symbol vectors selected in accordance with a relative distance relationship therebetween.

55. The symbol processor of claim 50, wherein the symbol comprises a complementary code keyed symbol compliant with IEEE 802.11b (1999).

56. The symbol processor of claim 50, wherein the scalar relationship comprises at least one of:
a distance between the maximum and next-maximum correlation candidates; and
a magnitude difference between the maximum and next-maximum correlation candidates.

57. The symbol processor of claim 50, further comprising:
means for determining a decided symbol for the symbol perceived within the modulated signal;
means for calculating a second scalar relationship between a vector corresponding to the decided symbol and a reference; and
means for deriving a second signal quality associated with the modulated signal based on the second scalar relationship.

58. The symbol processor of claim 57, wherein said second signal quality derivation means comprises
means for comparing the scalar relationship to a threshold; and
means for generating one of a first signal if the second scalar relationship is less than the threshold and a second signal if the second scalar relationship at least meets the threshold.

59. A receiver, comprising:
means for receiving a modulated signal in accordance with a receiver characteristic;
means for processing a symbol perceived within the modulated symbol, comprising:
means for determining maximum and next-maximum correlation candidates for the symbol;
means for calculating a scalar relationship between the maximum and next-maximum correlation candidates; and
means for deriving a signal quality associated with the modulated signal based on the scalar relationship; and
means for altering a receiver characteristic based on said derived signal quality.

60. The receiver of claim 59, further comprising means for modifying the receiver characteristic based on the derived signal quality.

61. The receiver of claim 59, wherein
the symbol is defined by a plurality of chips; and
wherein said determining means comprises:
means for correlating the chips of the symbol against a plurality of possible candidate vectors; and
means for selecting as the maximum correlation candidate one of the plurality of possible candidate vectors most correlated to the chips of the symbol and capable of selecting as the next-maximum correlation candidate at least one of the plurality of possible candidate vectors other than the maximum correlation candidate most relatively correlated to the chips of the symbol.

62. The receiver of claim 61, wherein the correlating means further comprises means for deriving the plurality of possible candidate vectors from an ordered set of symbol vectors based on at least one characteristic of the modulated signal, the ordered set of symbol vectors being ordered according to a first order.

63. The receiver of claim 62, wherein
said correlating means includes means for generating a correlation parameter for each of the plurality of possible candidate vectors with respect to the chips of the symbol; and
wherein said selecting means comprises means for assessing the correlation parameters using one of:
a sequential comparison process following the first order; and
a modified sequential comparison process following a second order associated with the set of symbol vectors, the second order being dissimilar from the first order.

64. The receiver of claim 63, wherein the second order is defined with respect to at least one subset of the set of symbol vectors, the subset including plural members of the set of symbol vectors selected in accordance with a relative distance relationship therebetween.

65. The receiver of claim 59, wherein the symbol comprises a complementary code keyed symbol compliant with IEEE 802.11b (1999).

66. The receiver of claim 59, wherein the scalar relationship comprises at least one of:
a distance between the maximum and next-maximum correlation candidates; and
a magnitude difference between the maximum and next-maximum correlative candidates.

67. The receiver of claim 59, wherein said symbol processing means further comprises:
means for determining a decided symbol for the symbol perceived within the modulated signal;
means for calculating a second scalar relationship between a vector corresponding to the decided symbol and a reference; and
means for deriving a second signal quality associated with the modulated signal based on the second scalar relationship.

68. The receiver of claim 67, wherein said second signal quality deriving means comprises means for comparing the scalar relationship to a threshold and generating one of a first signal if the second scalar relationship is less than the threshold and a second signal if the second scalar relationship at least meets the threshold.

69. A transceiver, comprising:
means for transmitting a first modulated signal;
means for receiving a second modulated signal in accordance with a receiver characteristic;
means for processing a symbol perceived within the modulated symbol, comprising:
means for determining maximum and next-maximum correlation candidates for the symbol;

means for calculating a scalar relationship between the maximum and next-maximum correlation candidates; and means for deriving a signal quality associated with the modulated signal based on the scalar relationship; and means for altering a receiver characteristic based on said derived signal quality.

70. A base station, comprising:

means for transmitting and receiving a modulated signal, said receiving means comprising:

means for receiving the modulated signal in accordance with a receiver characteristic;

means for processing a symbol perceived within the modulated symbol, comprising:

means for determining maximum and next-maximum correlation candidates for the symbol;

means for calculating a scalar relationship between the maximum and next-maximum correlation candidates; and means for deriving a signal quality associated with the modulated signal based on the scalar relationship; and means for altering a receiver characteristic based on said derived signal quality.

71. A network interface, comprising:

means for transferring data;

means for receiving a modulated signal, comprising:

means for receiving the modulated signal in accordance with a receiver characteristic; and means for processing a symbol perceived within the modulated symbol, comprising:

means for determining maximum and next-maximum correlation candidates for the symbol;

means for calculating a scalar relationship between the maximum and next-maximum correlation candidates; and means for deriving a signal quality associated with the modulated signal based on the scalar relationship; and means for altering a receiver characteristic based on said derived signal quality.

72. An information processing system, comprising:

means for processing information;

means for receiving a modulated signal responsive to said information processing means, said receiving means comprising:

means for receiving the modulated signal in accordance with a receiver characteristic; and means for processing a symbol perceived within the modulated symbol, comprising:

means for determining maximum and next-maximum correlation candidates for the symbol;

means for calculating a scalar relationship between the maximum and next-maximum correlation candidates; and means for deriving a signal quality associated with the modulated signal based on the scalar relationship; and means for altering a receiver characteristic based on said derived signal quality.

\* \* \* \* \*

UNITED STATES PATENT AND TRADEMARK OFFICE
CERTIFICATE OF CORRECTION

PATENT NO. : 7,324,433 B1  Page 1 of 1
APPLICATION NO. : 10/105130
DATED : January 29, 2008
INVENTOR(S) : Yungping Hsu et al.

It is certified that error appears in the above-identified patent and that said Letters Patent is hereby corrected as shown below:

| | |
|---|---|
| Column 1, Line 47 | Delete "as" and insert -- at -- |
| Column 1, Line 50 | Delete "801.11b" and insert -- 802.11b -- |
| Column 1, Line 56 | Delete "801.11" and insert -- 802.11 -- |
| Column 2, Line 11 | Delete "selective" and insert --selectable -- |
| Column 6, Line 3 | Delete "correction" and insert -- correlation -- |
| Column 6, Line 8 | Delete "correcting" and insert -- correlating -- |
| Column 4, Line 22 | Insert -- 140 -- after "processor" |
| Column 4, Line 24 | Delete "DAC" and insert -- ADC -- |

Signed and Sealed this

Tenth Day of June, 2008

JON W. DUDAS
*Director of the United States Patent and Trademark Office*